(12) United States Patent
Maneriker et al.

(10) Patent No.: US 11,038,785 B2
(45) Date of Patent: Jun. 15, 2021

(54) FACILITATING CHANGES TO ONLINE COMPUTING ENVIRONMENT BY ASSESSING IMPACTS OF TEMPORARY INTERVENTIONS

(71) Applicant: Adobe Inc., San Jose, CA (US)

(72) Inventors: Pranav Ravindra Maneriker, Columbus, OH (US); Reshmi Sasidharan, Kerala (IN); Atanu R. Sinha, Bangalore (IN)

(73) Assignee: Adobe Inc., San Jose, CA (US)

( * ) Notice: Subject to any disclaimer, the term of this patent is extended or adjusted under 35 U.S.C. 154(b) by 37 days.

(21) Appl. No.: 16/253,467

(22) Filed: Jan. 22, 2019

(65) Prior Publication Data
US 2020/0236023 A1    Jul. 23, 2020

(51) Int. Cl.
*H04L 12/26* (2006.01)
*H04L 12/24* (2006.01)

(52) U.S. Cl.
CPC .......... *H04L 43/0823* (2013.01); *H04L 41/14* (2013.01); *H04L 41/22* (2013.01)

(58) Field of Classification Search
CPC ...... H04L 41/14; H04L 41/22; H04L 43/0823
See application file for complete search history.

(56) References Cited

U.S. PATENT DOCUMENTS

| 2012/0158488 A1* | 6/2012 | Bottou | G06Q 30/0243 |
| | | | 705/14.42 |
| 2017/0323327 A1* | 11/2017 | Pachisia | G06Q 30/0244 |
| 2018/0316707 A1* | 11/2018 | Dodson | H04L 63/1416 |

OTHER PUBLICATIONS

Bertrand, Marianne, et al., "How Much Should We Trust Differences-In-Differences Estimates?", The Quarterly journal of economics, 119(1), 2004, 39 pages.

Athey, Susan, et al., "Identification and Inference in Nonlinear Difference-In-Differences Models", Econometrica, 74(2), Mar. 2006, 67 pages.

(Continued)

*Primary Examiner* — Azizul Choudhury
(74) *Attorney, Agent, or Firm* — Kilpatrick Townsend & Stockton LLP (57) ABSTRACT

In some embodiments, an intervention evaluation system estimates counterfactual metric for a focal online platform based on an assessment model built using performance data of the focal online platform and control online platforms. The intervention evaluation system accesses performance data of the focal online platform that has been subject to a temporary intervention and performance data of control online platforms that are not subject to the temporary intervention. The intervention evaluation system determines estimation weights for these control online platforms based on the performance data in a pre-intervention period. Based on the estimation weights, the intervention evaluation system computes a counterfactual metric indicating the performance of the focal online platform in a post-intervention period in the absence of the temporary intervention. The counterfactual metric is transmitted to the focal online platform, where the counterfactual metric is usable for modifying an interactive computing environment provided by the focal online platform.

20 Claims, 5 Drawing Sheets

(56) References Cited

OTHER PUBLICATIONS

Sinha, Atanu, et al., "Anti-Ad Blocking Strategy: Measuring its True Impact", in Proceedings of the ADKDD'17, ACM, Aug. 2017, 6 pages.
Abadie, Abadie, et al., "Synthetic Control Methods for Comparative Case Studies: Estimating the Effect of California's Tobacco Control Program", Journal of the American statistical Association, 105(490), 2010, 13 pages.
Gupta, Sunil, "Impact of Sales Promotions on When, What, and How Much to Buy", Journal of Marketing research, vol. 25, No. 4, Nov. 1988, 14 pages.

* cited by examiner

FACILITATING CHANGES TO ONLINE COMPUTING ENVIRONMENT BY ASSESSING IMPACTS OF TEMPORARY INTERVENTIONS

TECHNICAL FIELD

This disclosure relates generally to facilitating modifications to interactive computing environments based on evaluating the performance of these environments. More specifically, but not by way of limitation, this disclosure relates to evaluating an interactive computing environment with an assessment model that assesses how temporary interventions impact the interactive computing environment, and, in some cases, performing modifications to the evaluated interactive computing environment.

BACKGROUND

Interactive computing environments, such as web-based applications or other online software platforms, allow users to perform various computer-implemented functions through graphical interfaces. For instance, an interactive computing environment can provide functionalities such as allowing users to complete transactions in the computing environment, or post content, such as texts, images or videos, to graphical interfaces provided by the computing environment. The performance of the interactive computing environment can thus be measured by performance metrics such as the number of transactions completed using the computing environment or the number of items added to the graphical interfaces.

A temporary intervention to the interactive computing environment, such as a temporary change to the content of the graphical interfaces or a temporary slowdown caused by a fault in the interactive computing environment, can impact users' behaviors in interacting with the computing environment and thus impact the performance of the computing environment. For example, new content added to the graphical interfaces might increase the number of transactions completed in the computing environment, whereas the slowdown of the system might reduce the volume of the transactions or the content posted in the graphical interfaces. Such impact may continue even after the intervention is complete, for example, new content of the graphical interfaces has been removed or the computing environment functions as normal.

Understanding the impact of the intervention during and beyond the intervention period can help to determine the proper actions to be taken to modify the interactive computing environment so that the performance of the interactive computing environment can be improved. However, determining the impact of the intervention is often difficult due to the lack of data involving the performance metric that would have been measured from the interactive computing environment had the intervention not occurred. Existing methods are insufficient to evaluate such counterfactuals (i.e., system performance in the absence of an intervention). For example, some existing methods focus on examining the impacts of a permanent intervention, rather than temporary ones using models with fixed parameters instead of adapting these models to actual system data. As a result, these methods lead to an inaccurate estimation of the counterfactual metric.

SUMMARY

Certain embodiments involve evaluating an interactive computing environment with an assessment model that assesses how temporary interventions impact the interactive computing environment, and, in some cases, performing modifications to the evaluated interactive computing environment. In one example, an intervention evaluation system accesses focal performance data of a focal online platform that has been subject to a temporary intervention and control performance data of multiple control online platforms that are not subject to the temporary intervention. The intervention evaluation system determines estimation weights for these control online platforms based on the control performance data and the focal performance data in two or more examination windows contained in a pre-intervention period. Based on the estimation weights and the control performance data in a post-intervention period, the intervention evaluation system computes a counterfactual metric indicating the performance of the focal online platform in the post-intervention period in the absence of the temporary intervention. The intervention evaluation system transmits the counterfactual metric to the focal online platform, where the counterfactual metric is usable for modifying a user interface of an interactive computing environment provided by the focal online platform.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Certain embodiments involve evaluating an interactive computing environment with an assessment model that assesses how temporary interventions impact the interactive computing environment, and, in some cases, performing modifications to the evaluated interactive computing environment. For instance, an intervention evaluation system accesses focal performance data of a focal online platform that has been subject to a temporary intervention and control performance data of multiple control online platforms not subject to the temporary intervention. Based on the performance data, the intervention evaluation system determines an estimation weight for each of the control online platforms that can be used in an assessment model representing the relationship between the focal online platform and the control platforms. The intervention evaluation system determines the estimation weights using the performance data in one or more examination windows contained in a pre-intervention period. The intervention evaluation system then uses the assessment model to compute a counterfactual metric for the focal online platform that indicates a performance of the focal online platform in a post-intervention period in absence of the temporary intervention. The intervention evaluation system transmits the counterfactual metric to the focal online platform which can use the counterfactual metric to modify a user interface of an interactive computing environment provided by the focal online platform.

The following non-limiting example is provided to introduce certain embodiments. In this example, an intervention evaluation system is included in or in communication with a focal online platform providing an interactive computing environment that is being evaluated and that is subject to a temporary intervention. The intervention evaluation system executes one or more algorithms that allow for enhancing the performance of the focal online platform based on the impact of the temporary intervention. To do so, the intervention evaluation system accesses performance data from the focal online platform, where the performance data measures the performance metric of the focal online platform (e.g. the number of transactions performed on the focal online platform), and records various features associated with the focal online platform (e.g., the number of searches performed on the focal online platform). The intervention evaluation system further collects, from a set of control online platforms, performance data involving the same performance metric. The control online platforms are similar to the focal online platform (e.g., hosting a similar type of interactive computing environment with similar user-interface features), but are not subject to the temporary intervention. The intervention evaluation system builds an assessment model for the focal online platform, and determines the parameters for the assessment model using the performance data, from a pre-intervention period, of the focal online platform and the control online platforms. In this manner, certain embodiments can evaluate the impact of a temporary intervention on an interactive computing environment by adapting the parameters of the assessment model to actual system data.

For instance, in this example, the intervention evaluation system can select multiple examination windows in the pre-intervention period instead of a fixed examination window. For each of the examination windows, the intervention evaluation system determines a set of parameters for the assessment model using the performance data of the focal online platform and the control online platforms within that examination window. Examples of these parameters include weights of the performance metrics for the control online platforms used to estimate the performance metric of the focal online platform. The intervention evaluation system further calculates a pre-intervention deviation. If a set of parameters has the smallest pre-intervention deviation, the intervention evaluation system selects that set of parameters as the parameters for the assessment model. In this way, the examination window that generates the parameters for the assessment model is effectively selected based on the data, rather than being fixed beforehand. As a result, different data would lead to different examination window for generating the parameters for the assessment model. The intervention evaluation system applies the assessment model to the performance data of the control online platforms in the post-intervention period to estimate the counterfactual metric for the focal online platform.

In some embodiments, the intervention evaluation system provides the counterfactual metric to the focal online platform, which allows for determining the impact of the temporary intervention and corresponding modification to the focal online platform that improves the performance of the interactive computing environment hosted by the focal online platform. In one example, the content or layout of a user interface of the focal online platform can be modified to increase the performance metric, such as the number of transactions completed in the focal online platform. In another example, the focal online platform can be migrated to a different host system to reduce the interference from other services executing on the same host system. In yet another example, the architecture of the focal online platform can be modified to improve its response time and reduce the risk of system failure.

As described herein, certain embodiments provide improvements to interactive computing environments by solving problems that are specific to online platforms. These improvements include more effectively configuring the functionality of an interactive computing environment based on accurate and precise evaluations of temporary interventions, such as a temporary slowdown caused by a fault in the online platform, that can impact the ability to of user devices to interact with the online platform in a desired manner. Evaluating the impact of such temporary interventions within an interactive computing environment is uniquely difficult because temporary interventions could significantly impact a user's online experience but would prevent the user from recalling or evaluating the impact after the fact (e.g. via a survey) due to the nature of the short duration of the intervention.

Because these state-evaluation problems are specific to computing environments, embodiments described herein utilize automated models that are uniquely suited for assessing computing environments. For instance, a computing system automatically applies various rules of a particular type (e.g., various relationship between the control online platforms and the focal online platform captured in one or more models) to clickstream data, transaction data or other interaction data and thereby computes objective measurements of online experience, sometimes in a real-time manner. The measurements are objective at least because a computing system applies these rules in an automated manner, rather than relying on subject memories and judgments. The objective measurements are usable for enhancing a computing environment by, for example, modifying interface elements or other interactive aspects of the environment. Accurate and precise evaluations of the impact of a temporary intervention can enable effective configuration of the interactive computing environment, thereby reducing future negative impact of the intervention and providing a stable online platform. Consequently, certain embodiments more effectively facilitate modifications to a computing environment that facilitate desired functionality, as compared to existing systems.

As used herein, the term "online platform" is used to refer to software program, which when executed, provides an interactive computing environment having various interface elements with which user devices interact to achieve various goals. In this disclosure, the term "online platform" may also be used to refer to the interactive computing environment that it provides. For example, clicking or otherwise interacting with one or more interface elements during a session causes the online platform to manipulate electronic content, perform transactions, or otherwise interact with electronic content that is accessible via the online platform.

As used herein, the term "performance metric" is used to refer to a metric used to quantitatively measure the performance of a focal online platform. Examples of performance metrics include, but are not limited to, the number of user visits to the focal online platform, the click-through rate for an interface element of a graphical interface, the number of transactions performed on the focal online platform, and so on.

As used herein, the term "performance data" is used to refer to data generated or recorded by an online platform that describes the performance of the online platform and the associated features. An example of performance data includes the performance metric measuring the number of transactions completed on the online platform, and data associated with the transactions, such as the number of visit to the online platform, the number of queries submitted to the online platform, the content shown in the user interface of the online platform that are related to the transactions, and so on.

As used herein, the term "focal online platform" is used to refer to an online platform that is subject to a temporary intervention and for which a counterfactual metric is to be estimated.

As used herein, the term "temporary intervention" is used to refer to a temporary change to one or more aspects of the focal online platform, such as the appearance, the functionality, and/or the availability of the platform. For example, the temporary intervention includes a temporary change to the content, layout, settings, or other aspects of a user interface provided by the focal online platform. In another example, the temporary intervention includes a temporary slowdown or shutdown of the focal online platform due to system maintenance or a fault in the focal online platform.

As used herein, the term "counterfactual metric" is used to refer to a performance metric of the focal online platform after the temporary intervention has occurred that would have been measured for the focal online platform, had there been no temporary intervention.

As used herein, the term "control online platform" is used to refer to an online platform that has similar functionalities as the focal online platform but is not subject to the temporary intervention and is not impacted by the temporary intervention during the examined period of time. For example, if the focal online platform includes a content provider's website directed to users in one country, a control online platform can include the content provider's website directed to users in another country.

As used herein, the term "assessment model" is used to refer to a model, or the program code that implements the model, for assessing a counterfactual metric for a focal online platform subject to a temporary intervention based on the relationship between the focal online platform and the control online platforms.

Figure 1:
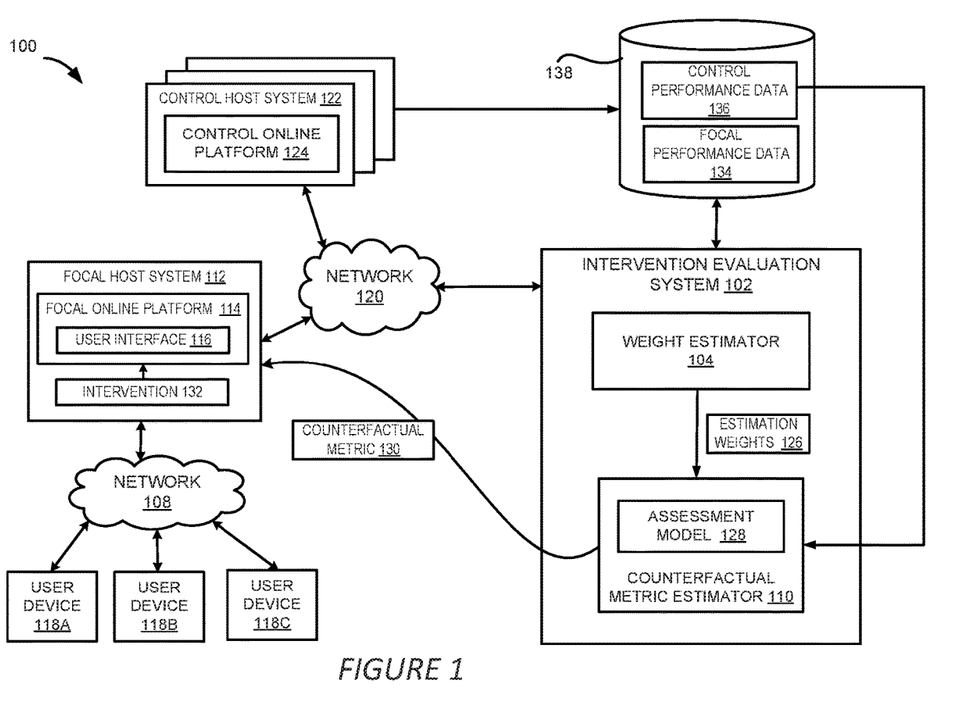
FIG. 1 depicts an example of a computing environment in which an intervention evaluation system can be used to evaluate the impact of a temporary intervention to a focal online platform and facilitate modifications to the focal online platform, according to certain embodiments of the present disclosure.

Referring now to the drawings, FIG. 1 is an example of a computing environment 100 in which an intervention evaluation system 102 can be used to evaluate the impact of a temporary intervention 132 on a focal online platform 114 provided by a host system 112 and, in some cases, facilitate modifications to the focal online platform 114. In various embodiments, the computing environment 100 includes the intervention evaluation system 102, the host system 112, and control host systems 122 hosting control online platforms 124.

Multiple user devices 118A-118C interact with the focal online platform 114, such as through a user interface 116 over a network 108. The network 108 may be a local-area network ("LAN"), a wide-area network ("WAN"), the Internet, or any other networking topology known in the art that connects the user devices 118 to the focal host system 112. The interactions can include users clicking on interface elements in the user interface 116, users initiating transactions through the user interface 116, such as a purchase transaction or a registration transaction, or users creating contents on the user interface 116, such as posting a comment, an image or a blog, etc.

The interactions between the users or their associated user devices 118 and the focal online platform 114 are saved as focal performance data 134. The focal performance data 134 include a performance metric measuring the performance of the focal online platform, such as the number of clicks on an interface element for a given period of time, such as a minute, an hour or a day, the number of transactions conducted within a given period of time, the number of new content items created by the users on the focal online platform, or other kinds of metrics. Other features associated with the focal online platform 114 during the interactions, such as the content displayed in the user interface, the number of user visits to the online platform, and the number of queries submitted to the online platform when the transactions are conducted, can also be included in the focal performance data 134.

A temporary intervention 132 might change the interactions between the user devices 118 and the focal online platform 114. The temporary intervention 132 might be a proactive intervention that is introduced intentionally by an administrator or other individuals associated with the focal online platform 114, such as a temporary change to the layout of the user interface 116, for example, to launch a campaign on the focal online platform 114. Changing the user interface layout might cause confusions of users and thereby reducing the number of clicks in the user interface 116. On the other hand, changing the user interface layout might draw attention of the users and increase the interest of the users exploring the focal online platform 114, thereby increasing the number of clicks in the user interface 116. The proactive intervention may also include changing the content of the user interface 116, such as adding or changing the content to provide an incentive for users to complete a transaction. For example, a displayed price associated with an item on the user interface 116 might be temporarily reduced. Offerings such as coupons, temporary price change, extra benefits, special informational emails might be provided on or through the user interface 116. A focal online platform hosting a media site might change its user interface to offer a subscription at a lower price than usual or to provide access to its archive. This type of interventions will lead to an increase in the number of transactions completed through the focal online platform 114.

In another example, the temporary intervention 132 involves an intentional adjustment of the configuration of the focal online platform 114. For instance, the temporary intervention 132 involves temporary unavailability of the focal online platform 114 due to a system maintenance. This type of changes in the interactions between the user devices 118 and the focal online platform 114 might reduce the performance of the focal online platform 114, such as reducing the number of clicks, transactions, or online posts on the focal online platform 114.

The temporary intervention 132 might also include a passive intervention that was not introduced intentionally by the administrator or other individuals associated with the focal online platform 114. For example, the temporary intervention 132 might be an unexpected power outage, a temporary network slowdown at the focal host system 112, or a temporary slowdown at the focal online platform 114 due to a sudden increase in demands or interference from other services provided by the same host system. This temporary malfunctioning of the focal online platform 114 would negatively impact the interactions between the user devices 118 and the focal online platform 114 or the value of a commodity offered on the focal online platform 114.

In order to quantify the impact of the temporary intervention 132 on the focal online platform 114, the intervention evaluation system 102 is employed to analyze the focal performance data 134 before and after the intervention. In addition, the intervention evaluation system 102 also examines the performance data of one or more control online platforms 124 hosted by one or more control host systems 122. The control online platforms 124 are selected to include online platforms having similar functionalities as the focal online platform 114 but serving a different set of users, such as users in a different geographical region. For example, if the focal online platform 114 includes a content provider's website directed to users in Germany, the control online platforms 124 can include the content provider's websites directed to users in other countries, such as UK, Spain, or France. In addition, because the control online platforms 124 are not subject to the temporary intervention 132, their performance data can be utilized to provide an accurate estimation of the counterfactual metric of the focal online platform 114.

To perform the analysis, the focal performance data 134 are transmitted to the intervention evaluation system 102 through a network 120 and stored at a datastore 138 associated with the intervention evaluation system 102. The network 120 may be the same as, or different from, the network 108 and may also be a LAN, a WAN, the Internet, or any other networking topology known in the art that connects the focal host system 112 to the intervention evaluation system 102. Similarly, the interactions between the control online platforms 124 and their associated user devices are saved as control performance data 136, which are transmitted over the network 120 and stored in the datastore 138. The control performance data 136 may be obtained directly from the control host systems 122 or from a third party data service.

The intervention evaluation system 102 employs a counterfactual metric estimator 110 to build an assessment model 128 based on the relationship between the focal online platform 114 and the control online platforms 124. In the assessment model 128, the counterfactual metric estimator 110 assigns each of the control online platforms 124 an estimation weight 126 and models the performance metric of the focal online platform 114 as a weighted combination of the performance metrics of the control online platforms 124. The intervention evaluation system 102 employs a weight estimator 104 to determine the estimation weights 126 for the assessment model 128 based on, for example, the focal performance data 134 and the control performance data 136 during a pre-intervention period.

Based on the estimation weights 126, the counterfactual metric estimator 110 uses the assessment model 128 to estimate the counterfactual metric 130 for the focal online platform 114. The counterfactual metric estimator 110 performs the estimation using the control performance data 136 during a post-intervention period. Additional details regarding determining the estimation weights 126 and the counterfactual metric 130 are provided below with regard to FIG. 3-5.

The intervention evaluation system 102 may transmit the estimated counterfactual metric 130 to the focal host system 112. In some embodiments, doing so causes the host system 112 to modify the focal online platform 114 to improve its performance. The focal host system 112 compares the counterfactual metric 130 with the actual performance metric observed at the focal online platform 114 during or after the temporary intervention 132 to determine an impact of the temporary intervention 132 on the focal online platform 114. Based on the determined impact, the user interface 116, the focal online platform 114 or the focal host system 112 can be modified to enhance the positive impact of the intervention and reduce the negative impact of the intervention.

In the above example where the temporary intervention 132 involves a temporary change to the layout of the user interface 116, if the impact of the temporary intervention 132 leads to an increase in the value of the performance metric, a development platform could generate new layouts or rearrange the layout for the user interface 116 so that the layout for the user interface 116 can be changed from time to time to keep attracting users to visit the focal online platform 114. If the impact turns out to be negative, i.e. the temporary layout of the user interface 116 leads to a decrease in the value of the performance metric, the development platform could avoid similar layout in the future layout design for the user interface 116. In various embodiments, the development platform performs these modifications automatically based on an analysis of the counterfactual metric 130, manually based on user inputs that occur subsequent to presenting the counterfactual metric 130, or some combination thereof.

In the example where the temporary intervention 132 includes changing the content of the user interface 116, such as to provide an incentive to users to complete a transaction, if the overall impact of the temporary intervention 132 is positive, i.e. the value of the performance metric during and after the temporary intervention 132 is higher than that of the counterfactual metric 130, the development platform could design and generate content changes similar to the temporary intervention 132 for the user interface 116 to further improve the performance of the focal online platform 114.

In the examples where the temporary intervention 132 causes the focal online platform 114 become temporarily unavailable, the focal online platform 114 can utilize the counterfactual metric 130 to determine the amount of the negative impact of the temporary intervention 132 on the performance metric of the focal online platform 114. If the negative impact is significant, the development platform could configure the focal host system 112 to be used exclusively for the focal online platform 114 or migrate the focal online platform 114 to another host system so that the focal online platform 114 is free from interference from other services.

If the temporary unavailability of the focal online platform 114 is caused by the maintenance of the focal online platform 114, the development platform could configure a backup system for the focal online platform 114 so that the functions of the focal online platform 114 are accessible during the maintenance. Similarly, for the unexpected temporary intervention, the administrator could configure the focal host system 112 with multiple performance enhancement mechanisms based on the amount of the negative impact, such as a backup host system, a backup power supply, an alternative network connection, an increased database capacity, or re-design the architecture of the focal online platform 114. To determine if the impact of the temporary intervention 132 is significant, the focal host system 112 compares the amount of impact, i.e. the difference between the value of the counterfactual metric 130 and the value of the actual performance metric of the focal online platform 114, with a threshold value.

One or more computing devices are used to implement the intervention evaluation system 102 and the host system 112. For instance, the intervention evaluation system 102, the host system 112, or both could include a single computing device, a group of servers or other computing devices arranged in a distributed computing architecture, etc.

The online platform 114 can be any suitable online service for interactions with the user devices 118. Examples of an online platform include a content creation service, an electronic service for entering into transactions (e.g., searching for and purchasing products for sale, or registering for certain services), a query system, etc. In some embodiments, one or more host systems 112 are third-party systems that operate independently of the intervention evaluation system 102 (e.g., being operated by different entities, accessible via different network domains, etc.). In additional or alternative embodiments, one or more host systems 112 include an intervention evaluation system 102 as part of a common computing system.

The user device 118 may be any device which is capable of accessing an online service. For non-limiting examples, user device 118 may be a smartphone, smart wearable, laptop computer, desktop computer, or other types of user device.

Figure 2:
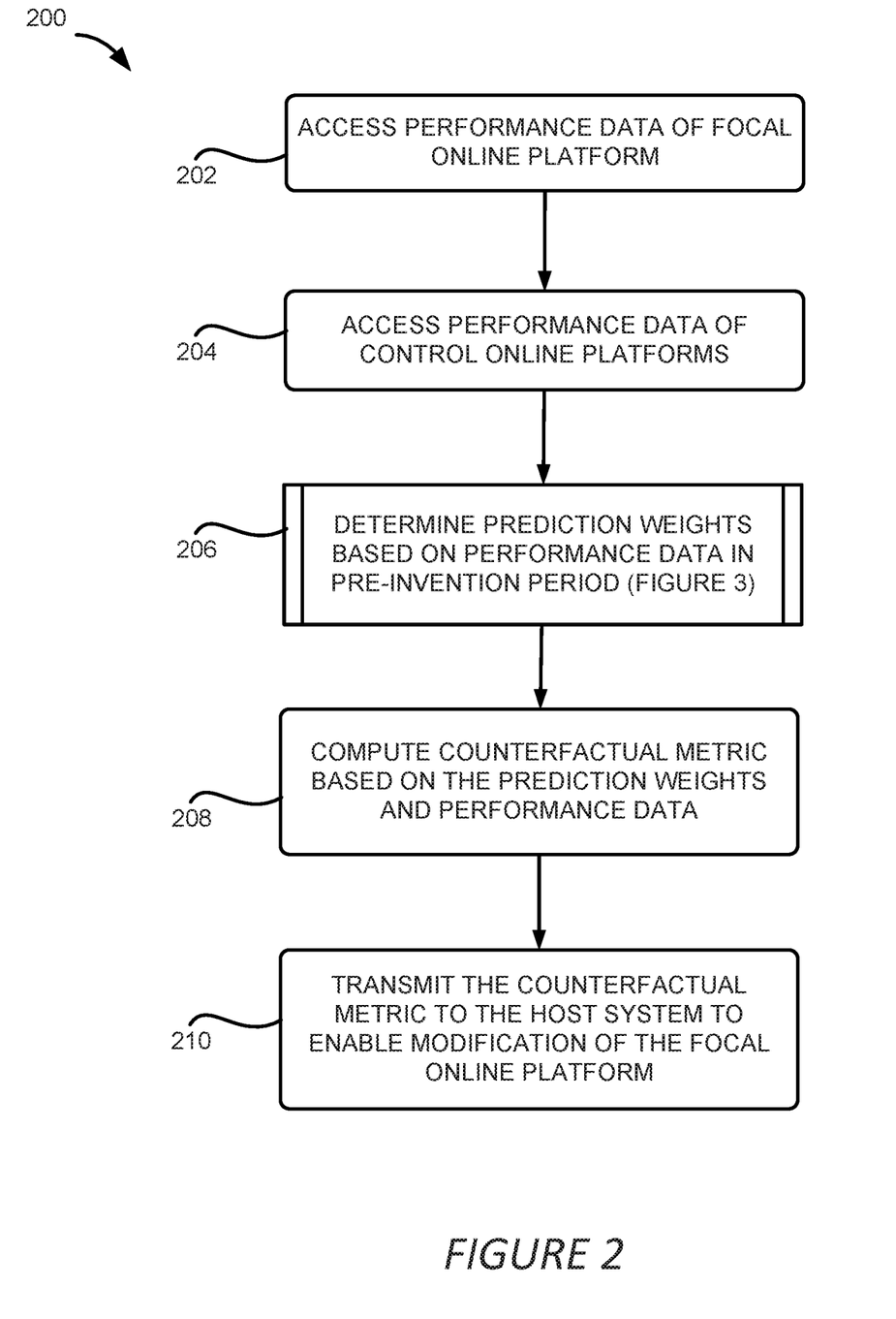
FIG. 2 depicts an example of a process for facilitating the modification of a focal online platform based on an estimated counterfactual metric of the focal online platform, according to certain embodiments of the present disclosure.

FIG. 2 depicts an example of a process 200 for facilitating the modification of a focal online platform 114 based on an estimated counterfactual metric 130, according to certain embodiments of the present disclosure. One or more computing devices (e.g., the computing environment 100) implement operations depicted in FIG. 2 by executing suitable program code. For illustrative purposes, the process 200 is described with reference to certain examples depicted in the figures. Other implementations, however, are possible.

At block 202, the process 200 involves accessing focal performance data 134. For instance, interactions between user devices 118 and the focal online platform 114 create focal performance data 134. The intervention evaluation system 102 accesses the focal performance data 134 from a suitable non-transitory computer-readable medium or other memory device, such as the datastore 138 associated with the intervention evaluation system 102. In some embodiments, the focal performance data 134 is stored on one or more non-transitory computer-readable media within host system 112. The intervention evaluation system 102 accesses the focal performance data 134 via suitable communications with a host system 112.

At block 204, the process 200 involves accessing control performance data 136. Similar to the focal performance data 134, the intervention evaluation system 102 may access the control performance data 136 from the control online platforms 124 via suitable communications with the control host systems 122. Alternatively, or additionally, the intervention evaluation system 102 may access the control performance data 136 from the datastore 138 where the control performance data 136 is stored.

At block 206, the process 200 involves determining estimation weights 126 associated with the control online platforms 124 in an assessment model 128. In some embodiments, the assessment model 128 for the counterfactual metric 130 of the focal online platform 114 includes a weighted combination of the performance metrics of the control online platforms 124. The estimation weights associated with the control online platforms 124 determine the relative contribution of the performance metric of the respective control online platforms 124 to the estimated counterfactual metric 130. Because the focal performance data 134 and the control performance data 136 in the pre-intervention period contain observed data for the focal online platform 114 and the control online platforms 124, these data can be utilized to establish the relationship between the focal online platform 114 and the control online platforms 124 thereby estimating the estimation weights 126. Detailed examples of determining the estimation weights 126 based on the focal performance data 134 and the control performance data 136 are described herein with respect to FIG. 3.

At block 208, the process 200 involves computing a counterfactual metric 130 for the focal online platform 114 based on the estimation weights 126 and the control performance data 136. In one embodiment, the assessment model 128 for the counterfactual metric 130 of the focal online platform 114 includes a weighted combination of the performance metrics of the control online platforms 124. If the estimation is for a post-intervention period, the assessment model 128 can be applied to the control performance data 136 in the post-intervention period to generate the counterfactual metric 130. If the estimation is for the intervention period, the assessment model 128 can be applied to the control performance data 136 in the intervention period to generate the counterfactual metric 130.

At block 210, the process 200 involves transmitting the counterfactual metric 130 to the focal host system 112 so that modification can be made to the focal online platform 114. In some embodiments, the counterfactual metric 130 may be transmitted to a management system configured to manage and configure the focal online platform 114. Based on the counterfactual metric 130, the focal host system 112 or other systems determine the impact of the temporary intervention 132 by computing a difference between the actual performance metric observed at the focal online platform 114 after the temporary intervention 132 has occurred and the counterfactual metric 130 received from the intervention evaluation system 102. Based on the computed impact, the focal host system 112 or other systems associated with the focal online platform 114 can modify the focal online platform 114 to improve its performance.

For instance, the focal host system 112 includes one or more computing devices that can modify interface elements of the user interface 116 provided by the focal online platform 114 based on the calculated impact of the temporary intervention 132, such as changing the content, layout or settings of the user interface 116. In another example, a server or other computing device may change the configuration of the focal host system 112 so that the focal online platform 114 is free from interference or intervention caused by other services. The focal online platform 114 may also be migrated from the focal host system 112 to another host system to reduce the occurrence of the temporary interventions. In addition, the server might add one or more backup mechanisms for the focal online platform 114 or even change the architecture of the focal online platform 114 to reduce the negative impact of future temporary interventions. The focal online platform 114 may also be modified in any suitable manner including, but not limited to, the examples discussed above with respect to FIG. 1.

Figure 3:
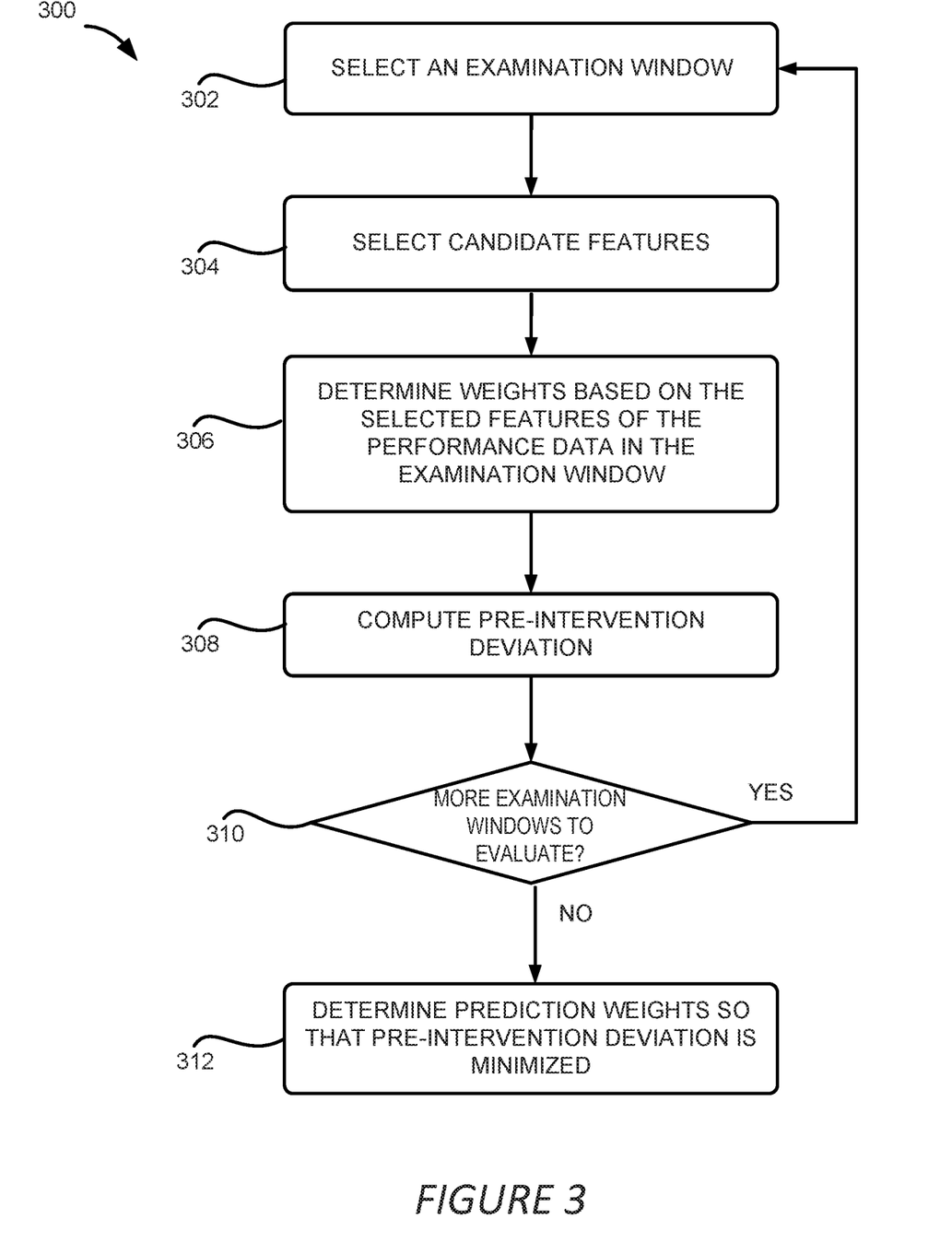
FIG. 3 depicts an example of a process for determining estimation weights of control online platforms used by the process of FIG. 2, according to certain embodiments of the present disclosure.

FIG. 3 depicts an example of process 300 for determining estimation weights 126 of the assessment model 128, according to certain embodiments of the present disclosure. The process 300 can be used to implement block 206 of the process 200. One or more computing devices (e.g., the computing environment 100) implement operations depicted in FIG. 3 by executing suitable program code (e.g., the intervention evaluation system 102). For illustrative purposes, the process 300 is described with reference to certain examples depicted in the figures. Other implementations, however, are possible.

Figure 4:
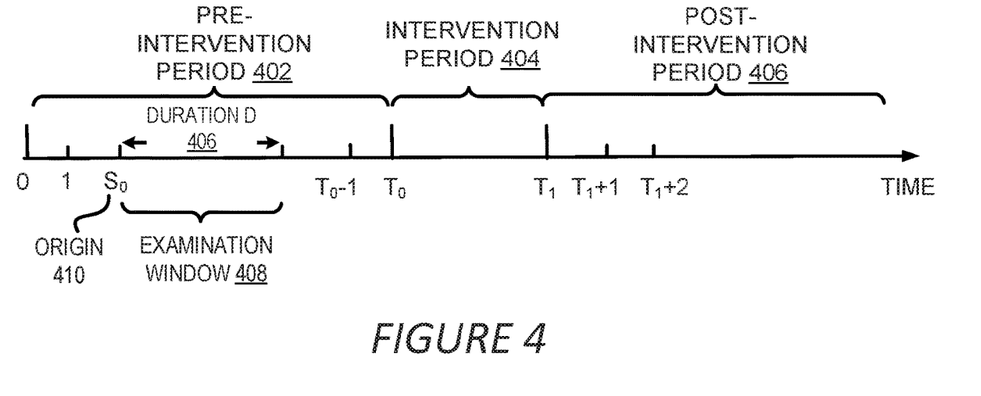
FIG. 4 depicts the relationship between the temporary intervention period, pre-intervention period, the selected pre-intervention period and the post-intervention period, according to certain embodiments of the present disclosure.

At block 302, the process 300 involves selecting an examination window from the pre-intervention period. FIG. 4 depicts the relationship between the pre-intervention period and the examination window, as well as the temporary intervention period and the post-intervention period. As shown in FIG. 4, there are three time periods involved here: a pre-intervention period 402, an intervention period 404, and a post-intervention period 406. The pre-intervention period 402 includes a period of time from time 0 to time $T_0$ when the temporary intervention 132 occurs. Time 0 can be the time point when the performance data start to be collected or any time point that the administrator determines as the start of the pre-intervention period 402. The intervention period 404 includes a time period from $T_0$ to $T_1$ when the temporary intervention 132 is finished. The post-intervention period 406 includes a time period from $T_1$ to any time point that the administrator decides to stop the analysis and the estimation of the counterfactual metric 130. An examination window 408 is contained within the pre-intervention period 402. The examination window 408 can be represented by an origin $S_0$ and a duration D.

Figure 5:
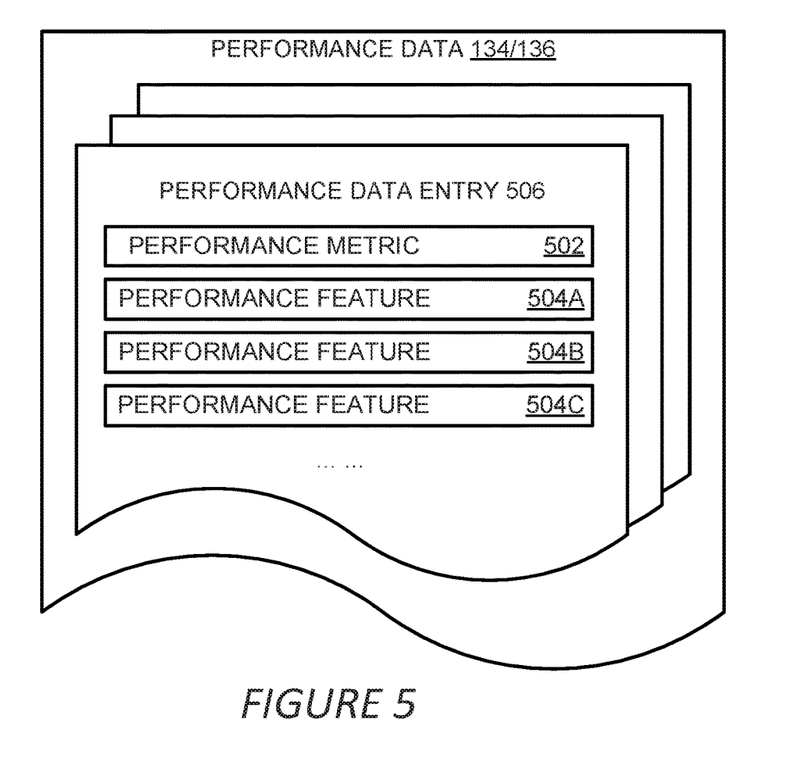
FIG. 5 depicts an example of a data structure for performance data used in estimating the counterfactual metric, according to certain embodiments of the present disclosure.

Referring back to FIG. 3, at block 304, the process 300 involves selecting candidate features from the performance data for determining the estimation weights 126. FIG. 5 depicts an example of a data structure for the performance data used in calculating the estimation weights 126, according to certain embodiments of the present disclosure. The data structure shown in FIG. 5 can be utilized for the focal performance data 134 or the control performance data 136. As shown in FIG. 5, the performance data 134 or 136 can be organized into multiple performance data entries 506, each of the performance data entries 506 corresponding to a time point shown in FIG. 4, such as an hour, a day or a week. For example, if the performance data is recorded daily, ten performance data entries 506 are created for a ten-day period, each entry corresponding to one day.

In the example shown in FIG. 5, a performance data entry 506 includes the performance metric 502 of the focal online platform 114 or a control online platform 124. In addition, the performance data entry 506 includes one or more performance features 504A-504C. The performance features 504 record the settings of the focal online platform 114 and/or the interactions between the user devices 118 and the focal online platform 114 when the performance metric 502 is determined. For example, if the performance data entry 506 records the daily activity of the focal online platform 114 and the performance metric 502 records the number of transactions occurred on an online platform (the focal online platform 114 or a control host system 122) for a given day, the performance features 504 can include the number of user visits to the online platform, the number of searches performed on the online platform, the content shown on a user interface provided by the online platform, such as transaction incentives, or other aspects of the online platform.

Returning to FIG. 3, the intervention evaluation system 102 selects, at block 304 of the process 300, candidate features from the performance features 504 of a data entry to facilitate the estimation of the estimation weights 126. In some embodiments, the intervention evaluation system 102 selects the candidate features so that the relationship between the performance metric 502 and the candidate features follows a specific function. In the above example, the intervention evaluation system 102 can select the number of searches and the amount of incentives shown on the online platform as the candidate features, denoted as $Z_1$ and $Z_2$, respectively. The relationship between the performance metric 502 of the focal platform, i.e. the number of transaction $Y_0$ at the focal platform at a given time point, and the candidate features $Z_{01}$ and $Z_{02}$ of the focal platform can be modeled as $g(Y_0)=f(Z_{01}, Z_{02})$, where $f(\ )$ is a linear function and go is a transformation function such as a log function.

At block 306, the process 300 involves determining weights based on the performance metric 502 and the candidate features of the focal performance data 134 and the control performance data 136 in the examination window 408. Denote the weights as $w=[w_1\ w_2\ \ldots\ w_N]$, wherein N is the number of control online platforms 124, and $w_i$ is the weight associated with the i-th control online platform 124. Denote the performance metric for a control online platform i at time t as $Y_{it}$ and the j-th candidate feature of the i-th control online platform as $Z_{ij}$. The weights that minimize a set of objective functions within the examination window 408, denoted as w*, can be determined as:

$$w^* = \arg\min_w \left(Y_{0t} - \sum_{i=1}^{N} w_i^* Y_{it}\right) = \arg\min_w \left(Z_{0j} - \sum_{i=1}^{N} w_i^* Z_{ij}\right), \quad (1)$$

where t traverses the examination window 408, i.e. $t=S_0, \ldots, S_0+D$; $j=1, \ldots, M$ and M is the number of candidate features.

In other words, the weights w* are selected to be ones that can minimize the difference between the performance metric of the focal online platform 114, $Y_{0t}$, and a linear combination of the performance metrics of the control online platforms 124, $\Sigma_{i=1}^{N} w_i^* Y_{it}$. The weights w* also match the candidate features of the focal online platform 114 and the control host systems 122 so that the difference between the candidate feature $Z_{0j}$ and the weighted combination of the candidate features for the control host systems 122, $\Sigma_{i=1}^{N} w_i^* Z_{ij}$, is minimized.

In some embodiments, the intervention evaluation system 102 performs the minimization in Equation (1) through iterative adjustments of the weight w to minimize the objective functions $Y_{0t}-\Sigma_{i=1}^{N} w_i^* Y_{it}$, and $Z_{0j}-\Sigma_{i=1}^{N} w_i^* Z_{ij}$ for $j=1, \ldots, M$. The iterative adjustments include adjusting the weights w through multiple iterations so that values of the objective functions in a current iteration are smaller than respective values of the objective functions in another iteration.

At block 308, the process 300 involves computing a pre-intervention deviation using the weights w* determined at block 306. In some embodiments, the pre-intervention deviation can be determined as:

$$L_W = \sum_t L\left(Y_{0t}, \sum_{i=1}^{N} w_i^* Y_{it}\right) \quad (2)$$

where L( ) is a loss function, and can be a Mean Absolute Percentage Error ("MAPE"), Mean Square Error ("MSE"), or Mean Absolute Deviation ("MAD"). The pre-intervention deviation $L_W$ is determined for the examination window 408.

At block 310, the process 300 involves determining if there are more examination windows to be evaluated. If so, the intervention evaluation system 102 selects another examination window at block 302 and repeat the process as described above. If there are no more examination windows left, the process 300 involves determining the estimation weights 126 at block 312. At block 312, the intervention evaluation system 102 compares the pre-intervention deviations for different examination windows, and selects the weights for the examination window that results in the least pre-intervention deviation as the estimation weights 126. As discussed above with regard to FIG. 2, the intervention evaluation system 102 utilizes the estimation weights 126 to estimate the counterfactual metric 130 for the focal online platform 114 as $\hat{Y}_{0t} = \sum_{i=1}^{N} w_i^* Y_{it}$, for $t > T_0$.

Example of Determining a Counterfactual Metric for an Online Transaction Platform In this example, the focal online platform 114 is an online platform directed to users in a focal country, and three control host systems 122 are the corresponding online platforms for users in three neighboring countries: C1, C2, and C3, respectively. The performance metric of the online platforms is the number of transactions completed daily on the respective online platform. The pre-intervention period is from Day 1 to Day 61. The temporary intervention period is from Day 62 to Day 68. The post-intervention period is from Day 69 to Day 91. The temporary intervention includes an incentive of transaction cost reduction for the intervention period.

The examination windows to be evaluated include a combination of an origin $S_0$ selected from {Day 1, Day 11, Day 21, Day 31} and a duration D selected from {30 days, 40 days, 50 days, 60 days}. Some of the combinations, however, are invalid and are thus removed. For example, an origin $S_0$ of Day 31 and a duration D of 60 days would lead to an examination window overlapping with the intervention period, and this examination will be removed from the list of examination windows. As a result, the valid examination windows include the combinations marked with a "Y" in Table 1.

TABLE 1

Valid examination windows

| Origin\Duration | 30 days | 40 days | 50 days | 60 days |
|---|---|---|---|---|
| Day 1 | Y | Y | Y | Y |
| Day 11 | Y | Y | Y | N |
| Day 21 | Y | Y | N | N |
| Day 31 | Y | N | N | N |

As discussed above, for each of the valid examination windows, the intervention evaluation system 102 calculates the weights for the assessment model using the control performance data 136 and the focal performance data 134 within the examination window based on Equation (1). The candidate features selected in this example includes the number of searches in the focal online platform and the transaction cost associated with each transaction. Based on the calculated weights, the intervention evaluation system 102 calculates a pre-intervention deviation using the performance metrics of the focal online platform 114 and the control online platforms 124 in the pre-intervention period. Tables 2-4 show the pre-intervention deviation $L_w$ for the weights generated using different examination windows. Tables 2, 3, and 4 show the results of the pre-intervention deviation $L_w$ using MSPE, MAPE, and MSE as the respective loss function.

TABLE 2

Pre-intervention deviation $L_w$ using MSPE as the loss function

| Origin\Duration | 30 Days | 40 Days | 50 Days | 60 Days |
|---|---|---|---|---|
| Day 1 | 0.071121 | 0.048883 | 0.062751 | 0.051075 |
| Day 11 | 0.064609 | 0.078439 | 0.061111 | |
| Day 21 | 0.106146 | 0.077519 | | |
| Day 31 | 0.113026 | | | |

TABLE 3

Pre-intervention deviation $L_w$ using MAPE as the loss function

| Origin\Duration | 30 Days | 40 Days | 50 Days | 60 Days |
|---|---|---|---|---|
| Day 1 | 0.091275 | 0.057749 | 0.082575 | 0.06747 |
| Day 11 | 0.074014 | 0.103218 | 0.080763 | |
| Day 21 | 0.139302 | 0.102212 | | |
| Day 31 | 0.146348 | | | |

TABLE 4

Pre-intervention deviation $L_w$ using MSE as the loss function

| Origin\Duration | 30 Days | 40 Days | 50 Days | 60 Days |
|---|---|---|---|---|
| Day 1 | 0.539623 | 0.370418 | 0.458775 | 0.374334 |
| Day 11 | 0.487689 | 0.573468 | 0.448024 | |
| Day 21 | 0.774835 | 0.567441 | | |
| Day 1 | 0.819714 | | | |

The results in Tables 2-4 show that the longest duration of 60 days does not yield the lowest pre-intervention deviation value. Given a duration, the origin most recent to the intervention period of Day 62 to Day 68 also does not yield the lowest pre-intervention deviation value. The weights generated for the examination window from Day 1 to Day 40 leads to the smallest pre-intervention deviation under all three types of loss function. The intervention evaluation system 102 thus determines the weights for this examination window as the estimation weights 126. Table 5 shows the values of the weights generated for different examination windows and the weights in the second row of Table 5 are the estimation weights 126, where the control online platform of neighboring country C3 has a weight 0.

TABLE 5

Weights for different examination windows.

| Duration | Optimal Origin Date | Wt. C1 | Wt. C2 | Wt. C3 |
|---|---|---|---|---|
| 30 days | Day 11 | 0.593 | 0.407 | 0 |
| 40 days | Day 1 | 0.572 | 0.428 | 0 |

TABLE 5-continued

Weights for different examination windows.

| Duration | Optimal Origin Date | Wt. C1 | Wt. C2 | Wt. C3 |
|---|---|---|---|---|
| 50 days | Day 11 | 0.346 | 0.654 | 0 |
| 60 days | Day 1 | 0.354 | 0.646 | 0 |

Using the estimation weights 126, the intervention evaluation system 102 determines the counterfactual transaction number based on actual transaction numbers of the control online platform, weighted by the estimation weights 126. Table 6 shows an estimate of the impact of the temporary intervention, which is defined as (Actual value of the performance metric—Estimated value of counterfactual metric)/Estimated value of the counterfactual metric. Table 6 also shows the estimated impact for two baseline methods that estimate the counterfactual metric using the performance data of the focal online platform 114 alone. The results in Table 6 show that the counterfactual metric estimation presented herein suggests a drop of 1.97% in the number of transactions, while baselines indicate an increase of 20.4% or 45.9% in the number of transactions, Based on the estimation of the counterfactual metric 130 and the estimated impact, the focal host system can distill the positive impact from the negative impact, and then can make proper changes to the focal online platform to increase the positive impact of the intervention while reducing the negative impact of the intervention.

TABLE 6

The estimated impact of the temporary intervention

| Estimation Method | Estimated impact |
|---|---|
| Counterfactual metric estimation presented herein | −1.97% |
| Baseline 1 (trained on 40 days from Sep 1) | +45.9% |
| Baseline 2 (trained on all 60 days of Pre-intervention data) | +20.4% |

Note that the counterfactual metric estimation presented herein can be performed using aggregate time series data rather than data on individual users. As a result, the counterfactual metric estimation can be performed more readily because the aggregate data are plentiful and not subject to the scrutiny of the General Data Protection Regulation.

Example of a Computing System for Implementing Certain Embodiments

Figure 6:
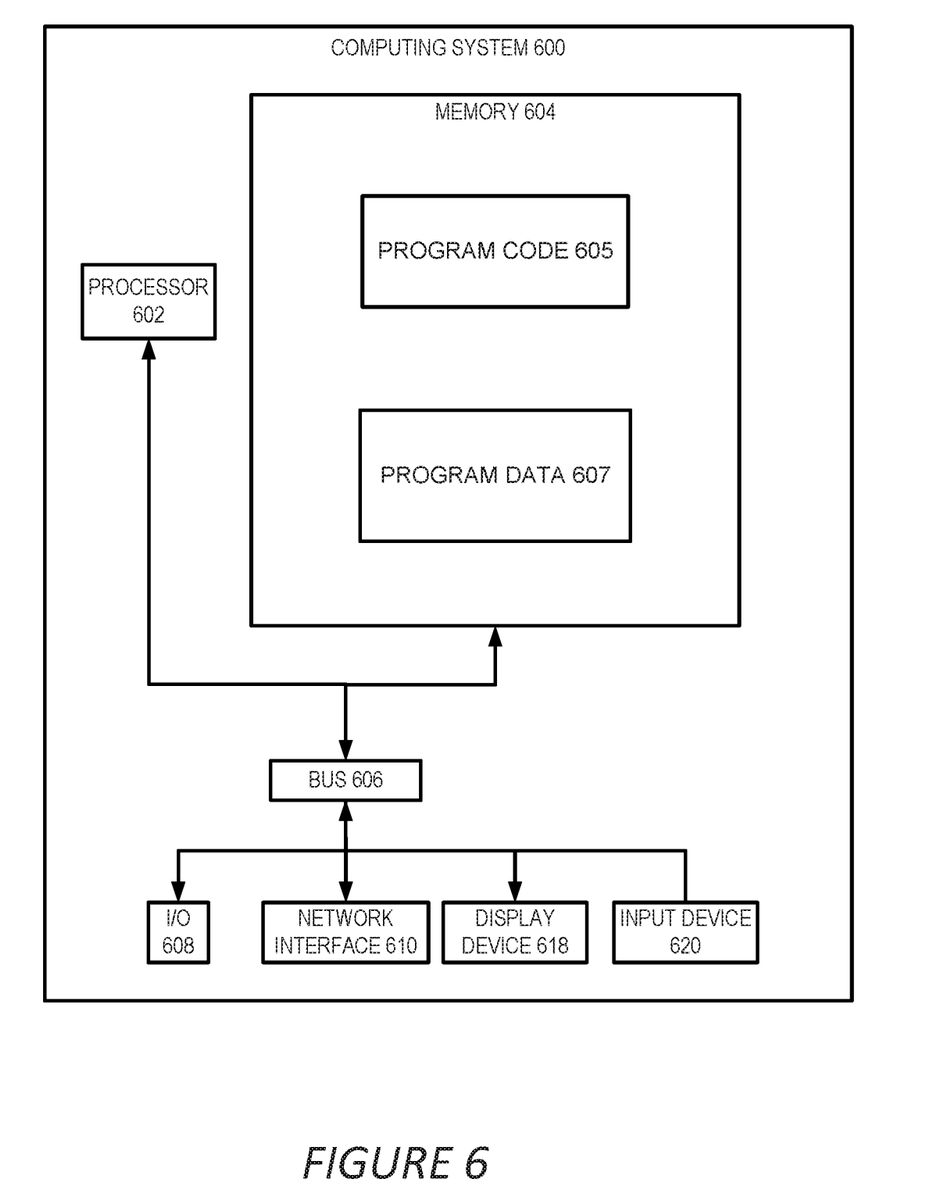
FIG. 6 depicts an example of a computing system for implementing certain embodiments of the present disclosure.

Any suitable computing system or group of computing systems can be used for performing the operations described herein. For example, FIG. 6 depicts an example of the computing system 600. The implementation of computing system 600 could be used for one or more of an intervention evaluation system 102, a host system 112, and a control host system 122. In other embodiments, a single computing system 600 having devices similar to those depicted in FIG. 6 (e.g., a processor, a memory, etc.) combines the one or more operations and data stores depicted as separate systems in FIG. 1.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

A memory device 604 includes any suitable non-transitory computer-readable medium for storing program code 605, program data 607, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 executes program code 605 that configures the processor 602 to perform one or more of the operations described herein. Examples of the program code 605 include, in various embodiments, the weight estimator 104 and the counterfactual metric estimator 110 by the intervention evaluation system 102, the focal online platform 114, the control online platform 124 or other suitable applications that perform one or more operations described herein (e.g., one or more development applications for configuring the online platforms 114 or 122). The program code may be resident in the memory device 604 or any suitable computer-readable medium and may be executed by the processor 602 or any other suitable processor.

In some embodiments, one or more memory devices 604 stores program data 607 that includes one or more datasets and models described herein. Examples of these datasets include interaction data, performance data, etc. In some embodiments, one or more of data sets, models, and functions are stored in the same memory device (e.g., one of the memory devices 604). In additional or alternative embodiments, one or more of the programs, data sets, models, and functions described herein are stored in different memory devices 604 accessible via a data network. One or more buses 606 are also included in the computing system 600. The buses 606 communicatively couples one or more components of a respective one of the computing system 600.

In some embodiments, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices (e.g., a computing device executing an intervention evaluation system 102) via a data network using the network interface device 610.

The computing system 600 may also include a number of external or internal devices, an input device 620, a presentation device 618, or other input or output devices. For example, the computing system 600 is shown with one or more input/output ("I/O") interfaces 608. An I/O interface 608 can receive input from input devices or provide output to output devices. An input device 620 can include any device or group of devices suitable for receiving visual, auditory, or other suitable input that controls or affects the operations of the processor 602. Non-limiting examples of the input device 620 include a touchscreen, a mouse, a keyboard, a microphone, a separate mobile computing device, etc. A presentation device 618 can include any device or group of devices suitable for providing visual, auditory, or other suitable sensory output. Non-limiting examples of the presentation device 618 include a touchscreen, a monitor, a speaker, a separate mobile computing device, etc.

Although FIG. 6 depicts the input device 620 and the presentation device 618 as being local to the computing device that executes the intervention evaluation system 102, other implementations are possible. For instance, in some embodiments, one or more of the input device 620 and the presentation device 618 can include a remote client-computing device that communicates with the computing system 600 via the network interface device 610 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   accessing (i) focal performance data of a focal online platform that has been subject to a temporary intervention and (ii) control performance data of a plurality of control online platforms not subject to the temporary intervention;
   determining estimation weights for the plurality of control online platforms based on the control performance data and the focal performance data in two or more examination windows contained in a pre-intervention period that is prior to a time period when the focal online platform is subject to the temporary intervention;
   computing, based on the estimation weights and the control performance data in a post-intervention period, a counterfactual metric indicating a performance of the focal online platform in the post-intervention period in the absence of the temporary intervention; and
   transmitting the counterfactual metric to the focal online platform, wherein the counterfactual metric is usable for modifying a user interface of an interactive computing environment provided by the focal online platform.

2. The method of claim 1, wherein determining the estimation weights for the plurality of control online platforms comprises:
   selecting, from a pre-intervention period, a first examination window, the first examination window comprising a first combination of an origin and a duration of the first examination window;
   computing a first set of weights for the plurality of control online platforms based on the control performance data in the first examination window; and
   calculating a first error metric between a first weighted summation comprising the control performance data weighted by the first set of weights and the focal performance data over the pre-intervention period.

3. The method of claim 2, wherein determining the estimation weights for the plurality of control online platforms further comprises:
   selecting, from the pre-intervention period, a second examination window, the second examination window comprising a second combination of an origin and a duration of the second examination window;
   computing a second set of weights for the plurality of control online platforms based on the control performance data over the second examination window;
   calculating a second error metric between a second weighted summation comprising the control performance data weighted by the second set of weights and the focal performance data over the pre-intervention period; and
   determining the estimation weights associated with the plurality of control online platforms to be the first set of weights based on the first error metric being lower than the second error metric or the second set of weights based on the first error metric being higher than the second error metric.

4. The method of claim 3, wherein computing the first set of weights for the plurality of control online platforms based on the control performance data over the first examination window comprises:
performing iterative adjustments of the first set of weights for the plurality of control online platforms to minimize two or more objective functions, wherein one or more of the iterative adjustments comprises adjusting the first set of weights for the plurality of control online platforms so that values of the two or more objective functions in a current iteration are smaller than respective values of the two or more objective functions in another iteration.

5. The method of claim 4, wherein the focal performance data and the control performance data each comprise a performance metric and one or more features, and wherein the two or more objective functions comprise an objective function for the performance metric and one or more objective functions for the one or more features.

6. The method of claim 1, further comprising computing the counterfactual metric based on the estimation weights and the control performance data in an intervention period.

7. The method of claim 1, wherein the counterfactual metric is computed as a linear combination of performance metrics of the plurality of control online platforms weighted using the respective estimation weights.

8. A system comprising:
a memory device storing performance data of a focal online platform and performance data of a plurality of control online platforms;
a host system configured for:
hosting the focal online platform that is subject to a temporary intervention, and modifying the focal online platform based on a counterfactual metric computed from the performance data of the focal online platform and performance data of the plurality of control online platforms that are not subject to the temporary intervention; and
an intervention evaluation system comprising:
one or more processing devices configured for performing operations comprising:
determining estimation weights associated with the plurality of control online platforms based on the performance data of the plurality of control online platforms and the performance data of the focal online platform in two or more examination windows contained in a pre-intervention period that is prior to a time period when the focal online platform is subject to the temporary intervention, and
computing the counterfactual metric based on the estimation weights and the performance data of the plurality of control online platforms in a post-intervention period; and
a network interface device configured for transmitting the counterfactual metric to the host system.

9. The system of claim 8, wherein modifying the focal online platform comprises one or more of:
changing interface elements of a user interface provided by the focal online platform;
migrating the focal online platform from a first host system to a second host system; or
adding one or more backup mechanisms to the focal online platform.

10. The system of claim 8, wherein determining the estimation weights associated with the plurality of control online platforms comprises:
selecting, from a pre-intervention period, a first examination window, the first examination window comprising a first combination of an origin and a duration of the first examination window;
computing a first set of weights for the plurality of control online platforms based on the performance data of the plurality of control online platforms over the first examination window; and
calculating a first error metric between a first weighted summation of the performance data of the plurality of control online platforms and the performance data of the focal online platform over the pre-intervention period.

11. The system of claim 10, wherein determining the estimation weights associated with the plurality of control online platforms further comprises:
selecting, from the pre-intervention period, a second examination window, the second examination window comprising a second combination of an origin and a duration of the second examination window;
computing a second set of weights for the plurality of control online platforms based on the performance data of the plurality of control online platforms over the second examination window;
calculating a second error metric between a second weighted summation of the performance data of the plurality of control online platforms and the performance data of the focal online platform over the pre-intervention period; and
determining the estimation weights associated with the plurality of control online platforms to be the first set of weights based on the first error metric being lower than the second error metric or the second set of weights based on the first error metric being higher than the second error metric.

12. The system of claim 11, wherein computing the first set of weights for the plurality of control online platforms based on the performance data of the plurality of control online platforms over the first examination window comprises:
performing iterative adjustments of the first set of weights for the plurality of control online platforms to minimize two or more objective functions, wherein one or more of the iterative adjustments comprises adjusting the first set of weights for the plurality of control online platforms so that values of the two or more objective functions in a current iteration are smaller than respective values of the two or more objective functions in another iteration.

13. The system of claim 12, wherein the performance data comprise a performance metric and one or more features, and wherein the two or more objective functions comprise an objective function for the performance metric and one or more objective functions for the one or more features.

14. The system of claim 8, wherein the counterfactual metric is computed as a linear combination of performance metrics of the plurality of control online platforms weighted using the respective estimation weights.

15. A non-transitory computer-readable medium having program code that is stored thereon, the program code executable by one or more processing devices for performing operations comprising:
accessing performance data of a focal online platform that has been subject to a temporary intervention, the performance data generated based on interactions between one or more user devices and the focal online platform via a user interface of the focal online platform;

accessing performance data of a plurality of control online platforms that are not subject to the temporary intervention, the performance data generated based on interactions between one or more user devices and the respective control online platforms via user interfaces of the plurality of control online platforms;

determining estimation weights associated with the plurality of control online platforms based on the performance data of the plurality of control online platforms and the performance data of the focal online platform in two or more examination windows contained in a pre-intervention period that is prior to a time period when the focal online platform is subject to the temporary intervention;

computing a counterfactual metric based on the estimation weights and the performance data of the plurality of control online platforms in a post-intervention period; and transmitting the counterfactual metric to the focal online platform, wherein the counterfactual metric is usable for modifying the focal online platform to improve a performance metric of the focal online platform.

16. The non-transitory computer-readable medium of claim 15, wherein determining the estimation weights associated with the plurality of control online platforms comprises:

selecting, from a pre-intervention period, a first examination window, the first examination window comprising a first combination of an origin and a duration of the first examination window;

computing a first set of weights for each of the plurality of control online platforms based on the performance data of the plurality of control online platforms over the first examination window; and calculating a first error metric between a first weighted summation of the performance data of the plurality of control online platforms and the performance data of the focal online platform over the pre-intervention period.

17. The non-transitory computer-readable medium of claim 16, wherein determining the estimation weights associated with the plurality of control online platforms further comprises:

selecting, from the pre-intervention period, a second examination window, the second examination window comprising a second combination of an origin and a duration of the second examination window;

computing a second set of weights for the plurality of control online platforms based on the performance data of the plurality of control online platforms over the second examination window;

calculating a second error metric between a second weighted summation of the performance data of the plurality of control online platforms and the performance data of the focal online platform over the pre-intervention period; and determining the estimation weights associated with the plurality of control online platforms to be the first set of weights based on the first error metric being lower than the second error metric or the second set of weights based on the first error metric being higher than the second error metric.

18. The non-transitory computer-readable medium of claim 17, wherein computing the first set of weights for the plurality of control online platforms based on the performance data of the plurality of control online platforms over the first examination window comprises:

performing iterative adjustments of the first set of weights for each of the plurality of control online platforms to minimize two or more objective functions, wherein one or more of the iterative adjustments comprises adjusting the first set of weights for the plurality of control online platforms so that values of the two or more objective functions in a current iteration are smaller than respective values of the two or more objective functions in another iteration.

19. The non-transitory computer-readable medium of claim 18, wherein the performance data comprise a performance metric and one or more features, and wherein the two or more objective functions comprise an objective function for the performance metric and one or more objective functions for the one or more features.

20. The non-transitory computer-readable medium of claim 15, wherein the counterfactual metric is computed as a linear combination of performance metrics of the plurality of control online platforms weighted using the respective estimation weights.

* * * * *